United States Patent [19]

Gabella et al.

[11] Patent Number: 4,620,435
[45] Date of Patent: Nov. 4, 1986

[54] DEFLECTION COMPENSATING ASSEMBLY FOR FABRICATING MACHINE TOOLS

[75] Inventors: Francois Gabella, Aubonne, Switzerland; Raymond J. Graf, Cincinnati; Carl W. Koors, Harrison, both of Ohio

[73] Assignee: Cincinnati Incorporated, Cincinnati, Ohio

[21] Appl. No.: 664,243

[22] Filed: Oct. 24, 1984

[51] Int. Cl.⁴ .............................................. B21D 9/05
[52] U.S. Cl. ........................................... 72/389; 72/448
[58] Field of Search ................ 72/448, 389, 386, 461, 72/465; 100/258 R, 258 A, 269 R

[56] References Cited

U.S. PATENT DOCUMENTS

| | | | |
|---|---|---|---|
| 2,199,864 | 5/1940 | Wehr | 72/448 |
| 4,098,109 | 7/1978 | Cailloux | 72/389 |
| 4,426,873 | 1/1984 | Pearson et al. | 72/389 |

Primary Examiner—W. D. Bray
Attorney, Agent, or Firm—Frost & Jacobs

[57] ABSTRACT

A deflection compensating assembly for deflection sensitive fabricating machine tools such as a press brake. In a press brake, for example, the deflection compensating assembly is mounted between the bed and the lower die or between the ram and the upper die. When mounted on the bed, the deflection compensating assembly, under load, will cause the lower die to become substantially parallel to the upper die. The deflection compensating assembly, under load, will cause the upper die to become substantially parallel to the lower die, when affixed to the ram. The deflection compensating assembly, is preferably a self-contained unit attachable to and detachable from the bed or ram and comprises a variable rate spring, the deflection of which, when under uniformly distributed full length load, is such that, when added to the combined bed and ram deflections, it yields a total deflection which is constant along the length of the bed and ram and will compensate for the bed and ram deflections.

14 Claims, 30 Drawing Figures

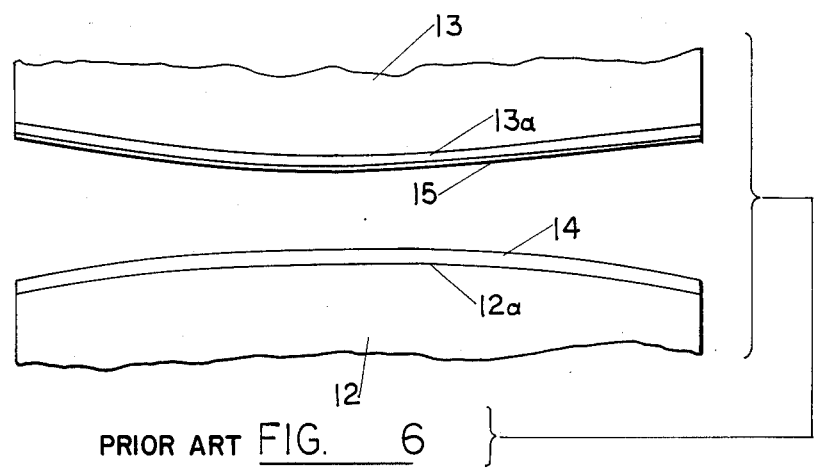
PRIOR ART FIG. 6
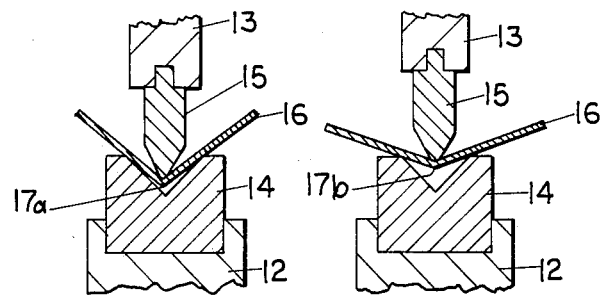
FIG. 7 PRIOR ART
FIG. 8 PRIOR ART
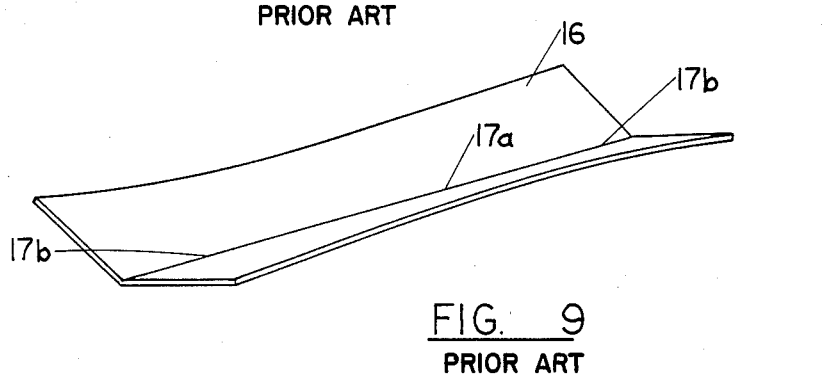
FIG. 9 PRIOR ART

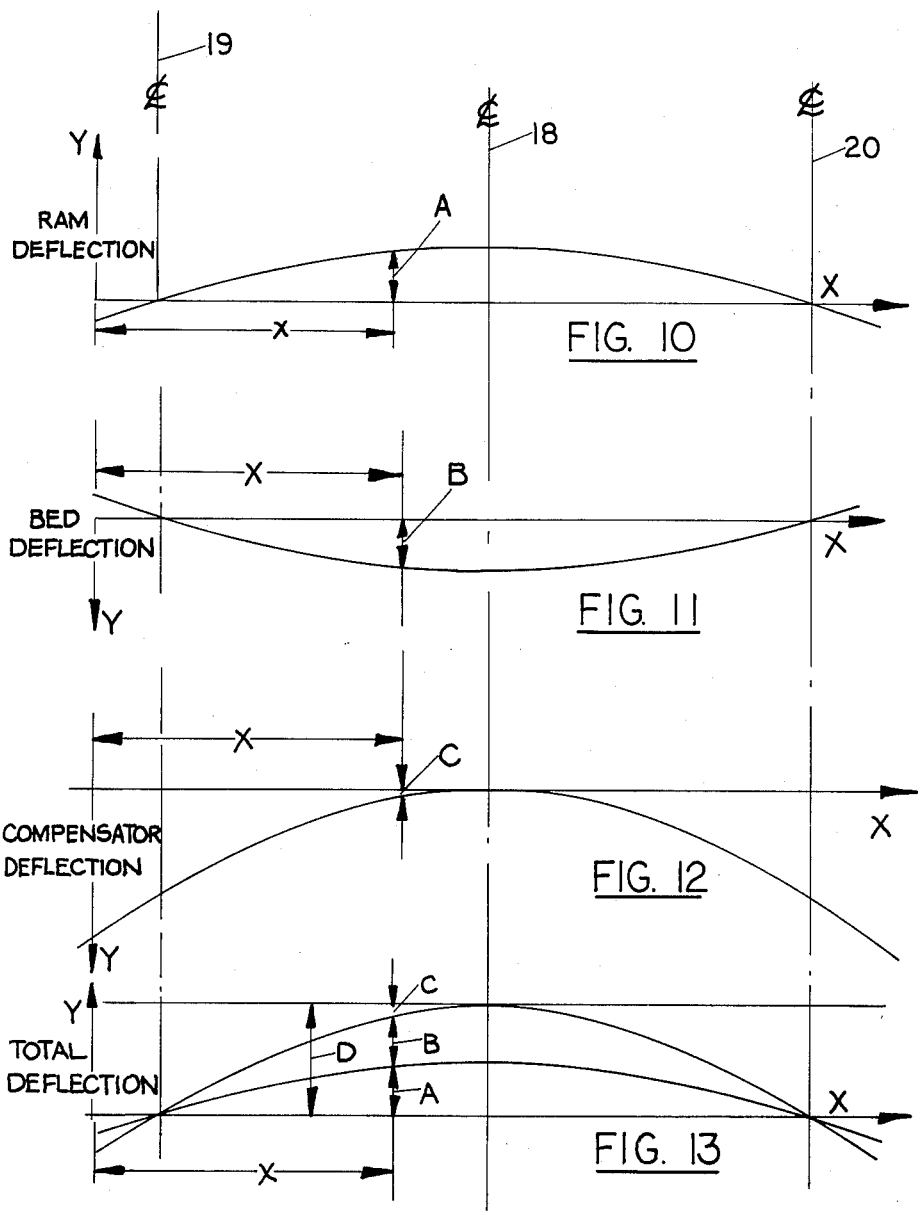

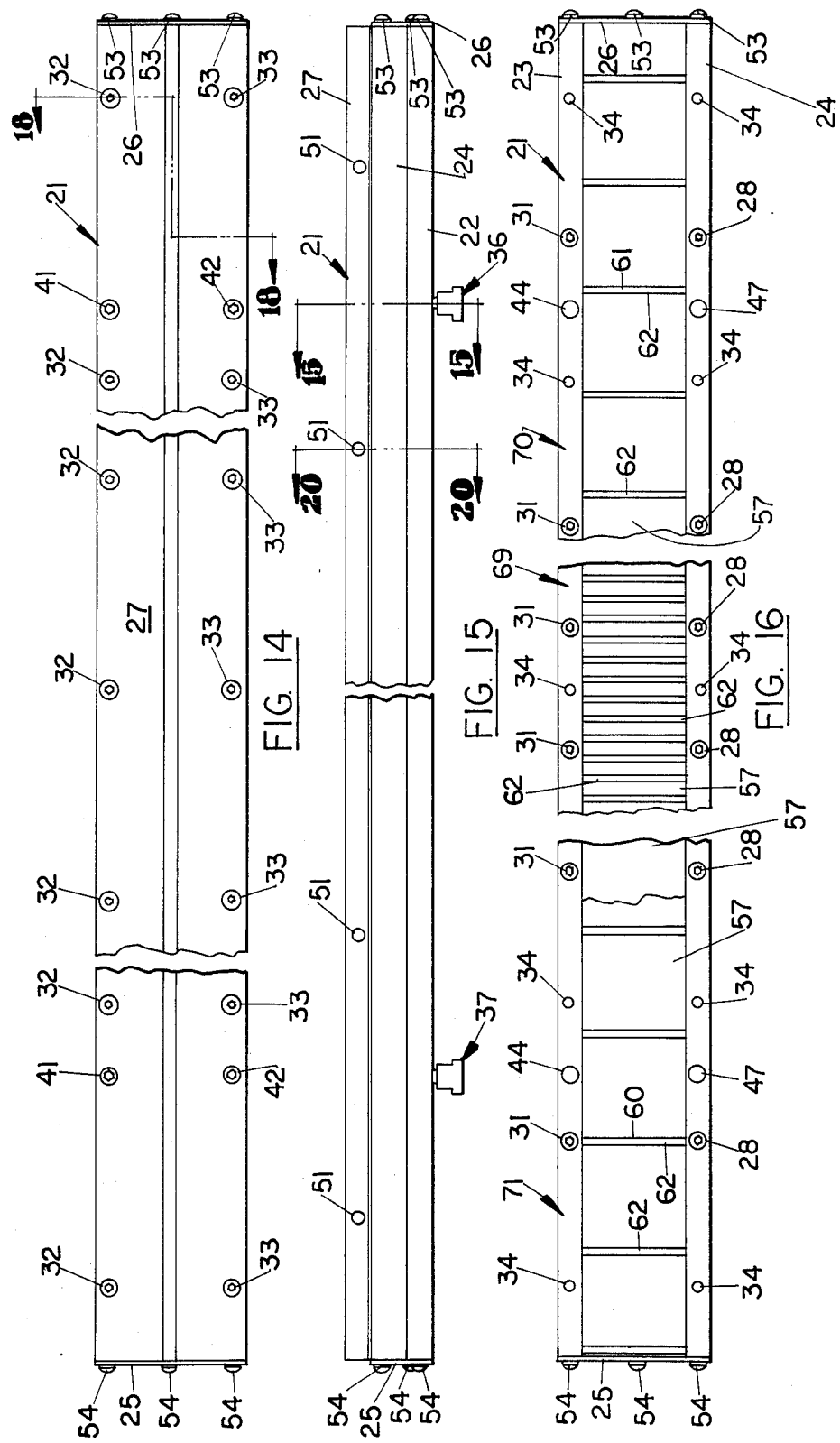

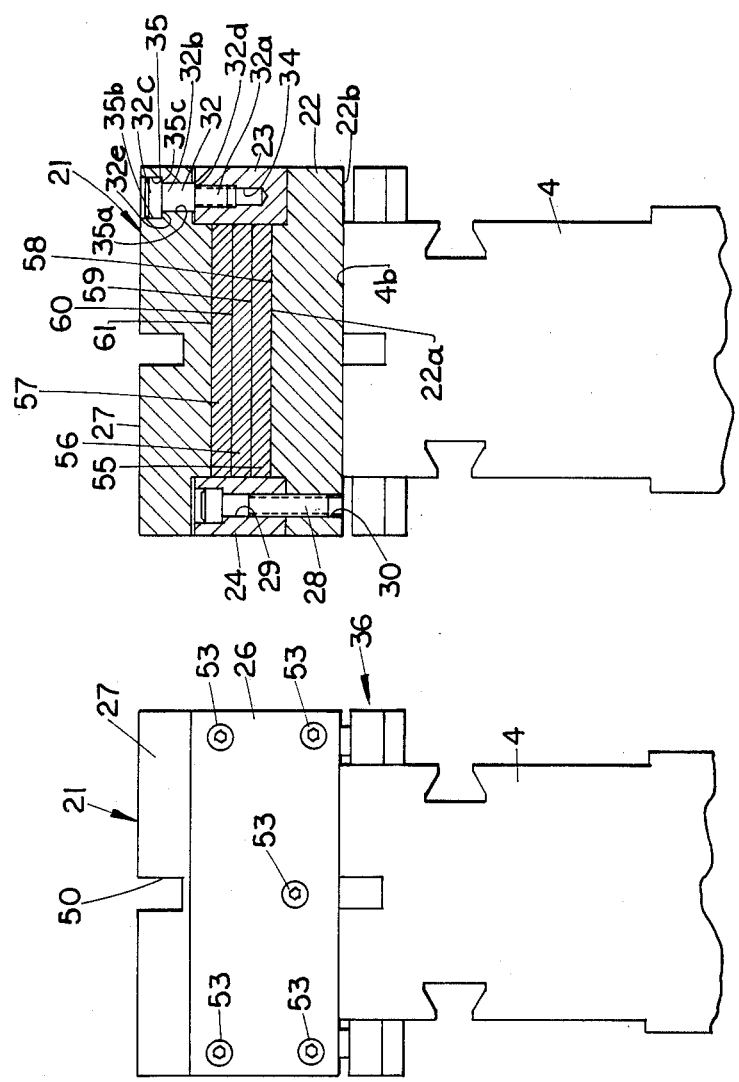

DEFLECTION COMPENSATING ASSEMBLY FOR FABRICATING MACHINE TOOLS

TECHNICAL FIELD

The invention relates to a deflection compensating assembly suitable for use with deflection sensitive fabricating machine tools, and more particularly to a deflection compensating assembly in the form of a variable rate spring or elastic member, the deflection of which, when subjected to a uniformly distributed load and when added to the undesirable combined deflections of other machine elements of the fabricating machine tool, is such that it yields a total deflection which is constant along the length of the workpiece treating elements of the machine, thus eliminating the effects of these undesired deflections.

BACKGROUND ART

The teachings with respect to the deflection compensating assembly of the present invention are applicable to any deflection sensitive fabricating machine tool. For purposes of clarity and for purposes of an exemplary showing, the invention will be described in its application to a hydraulically actuated press brake. This is a matter of convenience only, and does not constitute a limitation on the present invention. For example, the teachings of the present invention can be applied to other fabricating machine tools such as shears, bending rolls, presses and the like. The fabricating machine tools can be mechanically or hydraulically actuated.

In its most usual form, a hydraulically actuated press brake comprises a stationary bed, a ram mounted above the bed and capable of reciprocating movement toward and away from the bed in a vertical direction, a pair of substantially identical main cylinders operatively connected to the ends of the ram to shift the ram toward and away from the bed, and a source of hydraulic fluid under pressure to actuate the main cylinders. Deflections of the press brake bed and ram, when under load against a workpiece, constitute a problem which has plagued the industry from its beginning to the present day. Such deflections of the press brake bed and ram cause their cooperating tool or die-carrying edges to go out of parallelism during the work stroke.

The nature of this problem can most easily be explained by selecting, for example, one of the most common forms of press brake work, i.e., the air bending of a flat piece of metal into an angle. In the most usual instance of such an operation, the top or male die is mounted on the lower edge of the ram. When the ram moves downwardly, the top or male die pushes the workpiece into a lower or female die, mounted on the upper edge of the stationary bed. The inherent problem of bed and ram deflection, occurring as the result of bending load, creates a variation in the bend angle along the length of the bend in the workpiece.

Prior art workers have made numerous attempts to overcome this problem. A common practice is to shim one of the dies (usually the female die), or the filler block thereunder, so that the dies are parallel in the loaded condition. This solution is effective, but less than ideal. It is a trial-and-error process and hence very time consuming. Furthermore, it changes for each load condition. In today's factory, the trend to small lot sizes, makes this solution unacceptable.

Another approach has been to crown the tool or die carrying edges of the bed and ram, so that these edges are intentionally not parallel in the unloaded condition. They are closer together in the center than at the ends. The amount of this crown is carefully controlled so that the bed and ram are deflected into a parallel position when subjected to a load equal to some predetermined fraction (say $\frac{2}{3}$) of the machine's capacity distributed uniformly over the nominal length of the bed and ram. In bending operations wherein the load is equal to (or substantially equal to) this predetermined fraction of the machine's capacity, the male die penetration into the female die is constant and the bend angle is uniform along its length. For bending operations which depart from these predetermined conditions, this solution does not work well.

U.S. Pat. No. 3,702,558 teaches the provision of a compressible polyurethane member interposed between the lower die and bed of a press brake. The polyurethane member is of substantially the same length and in registry with the bend line of the workpiece. The polyurethane member is of uniform spring constant per linear inch of lower die holder. The polyurethane member exerts upward pressure against the center of the lower die, arching the lower die upwardly at the center toward the upper die to a degree which closely matches the upward arch of the upper die due to deflection. This results in bends in the workpiece of good uniformity throughout the length of the workpiece. However, the teachings of this patent are applicable only to the use of bottoming dies, and air bending of a flat piece of metal into a uniform angle cannot be accomplished with the compensating device of this patent.

In commonly owned, copending application Ser. No. 551,165, filed Nov. 14, 1983 in the name of Raymond J. Graf and entitled DEFLECTION COMPENSATING ASSEMBLY FOR A PRESS BRAKE, there is taught a deflection compensating cylinder and auxiliary cross-member assembly for use on hydraulically actuated press brakes. According to this copending application, a pair of auxiliary cross-members are located to each side of the bed, extending the majority of the length thereof, and being affixed to the bed by a pair of pins, each located near an end of the cross-members and extending therethrough and through the bed. The cross-members have corresponding, coextensive, longitudinal slots formed therein and located centrally thereof. The bed is provided with a similar slot, slightly offset in a vertical direction with respect to the cross-member slots. A deflection compensating cylinder is mounted in the cross-member and bed slots with the cylinder contacting one of the bed and the cross-members, and its piston contacting the other of the bed and the cross members. According to this reference, the compensating cylinder has a working area four times that of one of the main cylinders and is connected to the same hydraulic source as the main cylinders, being subject to the same pressure. As a result, when the bed and ram are under load against a workpiece, the compensating cylinder will remove the downward deflection of the bed and impart to the bed an upward deflection substantially similar to that of the ram. This causes the die-supporting edges of the ram and bed to remain substantially parallel under load. The reference further teaches that the deflection compensating assembly could be mounted on the ram, instead of the bed, to accomplish equivalent results. While the compensating assembly of the copending application can be employed in conjunction with both air bending dies and bottoming dies, as a practical matter the teachings of this copending application are essentially limited to the use of hydraulically actuated fabricating machine tools The present invention is based upon the provision of an elastic unit or spring unit having a variable spring rate. The deflection of the unit when under a uniformly distributed load and when added to the combined bed and ram deflection, yields a total deflection which is constant along the length of the ram and bed. The elastic unit is located between the lower die and the bed of the press brake, or between the upper die and the ram of the press brake. When the elastic unit is mounted on the bed, the bed and its die will achieve the configuration of the ram and its die when under a uniformly distributed load. When the elastic unit is affixed between the ram and the upper die, then the ram and the upper die (when under a uniformly distributed load) will achieve the configuration of the bed and its bottom die. Since the above noted total deflection is constant, the dies will remain parallel under load, yielding a uniform bend angle in the workpiece. Since the deflections of the ram, the bed and the compensating device are all proportional to the load, the device automatically compensates for a load of any appropriate magnitude.

The compensating assembly of the present invention is relatively inexpensive to manufacture and is more accurate than prior art devices for the length of bend for which it is designed. The compensating assembly of the present invention can be used in conjunction with both air bending dies and bottoming dies. In addition, the compensating assembly can be applied to both hydraulically actuated and mechanically actuated press brakes, and can also be applied to existing press brakes or the like of both the hydraulically actuated and mechanically actuated types.

DISCLOSURE OF THE INVENTION

According to the invention there is provided a deflection compensating assembly for deflection sensitive fabricating machine tools such as press brakes, bending rolls, shears, presses and the like. The deflection compensating assembly comprises a variable rate spring, the deflection of which, when under uniformly distributed load, is such that when added to the combined deflections of the workpiece contacting elements of the machine, yields a total deflection which is constant along the length of the workpiece contacting elements.

As applied to a press brake, for example, the deflection compensating assembly is mounted between either the bed or the ram and its respective die. When mounted on the bed, the deflection compensating assembly, under uniformly distributed load, causes the lower die to become substantially parallel to the upper die. In similar fashion, when mounted on the ram, the deflection compensating assembly, under uniformly distributed load, will cause the upper die to become substantially parallel to the lower die.

The deflection compensating assembly is preferably a self-contained unit attachable to and detachable from the bed or ram. In an exemplary working embodiment, the deflection compensating unit comprises an elongated metallic box-like structure having a bottom, longitudinal side walls and end plates. Means are provided by which the structure may be affixed to the upper edge of the bed. The box-like structure extends substantially the length of the bed.

The box-like structure is provided with a top. The top has a longitudinal central portion which extends downwardly between the box side walls, and lateral flanges which overlie the upper surfaces of the sidewalls. The top is affixed to the upper surfaces of the side walls by fastening means which render the top captively mounted on the box-like structure with the top side flanges being shiftable by a slight amount toward and away from the upper surfaces of the side walls.

The box-like structure contains a stack of substantially identical metallic plates so sized as to be just nicely received within the structure. Between the lowermost plate and the bottom of the box-like structure, between the uppermost plate and the central portion of the top and between the interface of adjacent plates there is located a plurality of metallic shims extending transversely to the plates. The shims are spaced between the plates in a staggered pattern, as will be described hereinafter. The plates act as beams which deflect when subjected to a load. Each shim applies the load to the plate below it and acts as a support for the plate above it. The shims are so arranged that the deflection of the plates is essentially zero at the longitudinal center of the unit and at a maximum at the ends of the unit. When no load is applied, the central longitudinal portion of the unit top rests on the layers of plates and shims with its flanges slightly spaced from the upper surfaces of the box sides. The unit top is provided with means by which the lower die can be mounted thereon. Since the unit top rests upon the stack of plates and shims with its longitudinal side flanges spaced upwardly from the upper surfaces of the unit sides, it is free to impart the load forces to the stack of plates and shims to bring about the desired deflection.

BRIEF DESCRIPTION OF THE DRAWINGS

FIG. 6 is a fragmentary, semi-diagrammatic view of a bed and ram, similar to FIG. 2 and illustrating in exaggerated form a predetermined crown in the bed and ram.

FIGS. 7 and 8 are fragmentary, semi-diagrammatic views, similar to FIGS. 3 and 4, illustrating the relative positions of the bed and ram and their respective dies, together with the bend in the workpiece at the longitudinal center of the workpiece and near one end of the workpiece, respectively, when the applied load condition does not match the crown conditions.

FIG. 9 is a perspective view illustrating the fully bent workpiece of FIGS. 7 and 8.

FIG. 10 is a plot of ram deflection versus position along the ram for a uniformly distributed capacity load.

FIG. 11 is a plot of bed deflection versus position along the bed for a uniformly distributed capacity load.

FIG. 12 is a plot of the deflection required of the compensating unit versus position along the compensating unit.

FIG. 13 is a plot of the sum of the deflections of the ram, the bed and the deflection compensating unit versus position along these elements.

FIG. 14 is a fragmentary plan view of an exemplary deflection compensating unit of the present invention.

FIG. 15 is a fragmentary side elevational view of the unit of FIG. 14.

FIG. 16 is a fragmentary plan view, partly in cross section, of the unit of FIG. 14 with the unit top removed.

FIG. 17 is a fragmentary end elevational view of the unit of FIGS. 14 through 16.

FIG. 18 is a fragmentary cross sectional view taken along section 18—18 of FIG. 14.

BRIEF DESCRIPTION OF THE INVENTION

While press brakes are capable of many operations, the nature of the problem sought to be overcome and the nature of the present invention will be described, for purposes of an exemplary showing, with respect to the simple operation of air bending a flat piece of metal into an angle.

Figure 1:
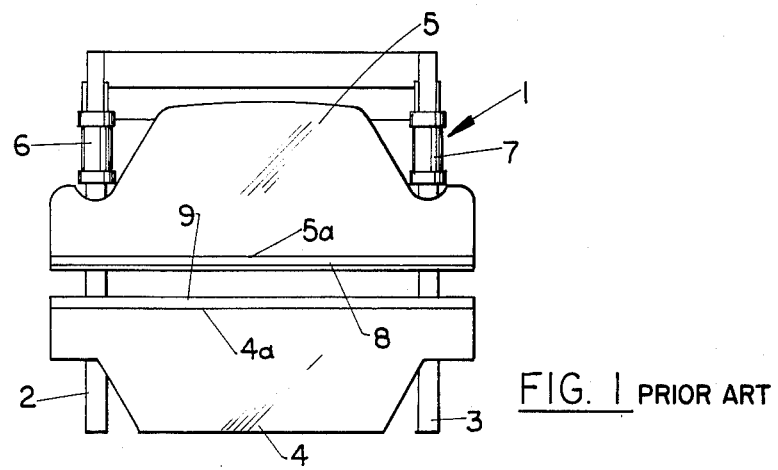
FIG. 1 is a semi-diagrammatic, front elevational view of a typical press brake wherein the tool or die-supporting edges of the bed and ram are normally parallel to each other.

Referring first to FIG. 1, a conventional press brake is generally indicated at 1. The press brake comprises a pair of side frames 2 and 3 on which is supported a stationary bed 4. A ram 5 is also operatively supported on side frames 2 and 3 for reciprocating movement toward and away from the bed 4. While the press brake can be mechanically actuated, for purposes of an exemplary showing the ram 5 is shown actuated by a pair of substantially identical hydraulic cylinders 6 and 7, themselves supported by side frames 2 and 3. The cylinders 6 and 7 are connected to a hydraulic fluid reservoir and pump arrangement (not shown), well known in the art and not a part of the present invention. The press brake 1 will also be provided with conventional controls (not shown).

In the most usual arrangement, a top die 8 is affixed to the die-supporting edge 5a of the ram and a cooperating lower die 9 is affixed to the die-supporting edge 4a of stationary bed 4. While not always the case, the top die 8 is generally a male die and the lower die 9 is usually a cooperating female die. The nature of the dies or tools carried by the ram 5 and bed 4 do not constitute a limitation on the present invention.

It is a problem, inherent in such press brakes, that when the bed 4 and ram 5 are under load against a workpiece, they will be subject to deflection. Many tons of force are involved, and for most operations, no matter how large and sturdy the bed 4 and ram 5, deflection thereof will occur.

Figure 2:
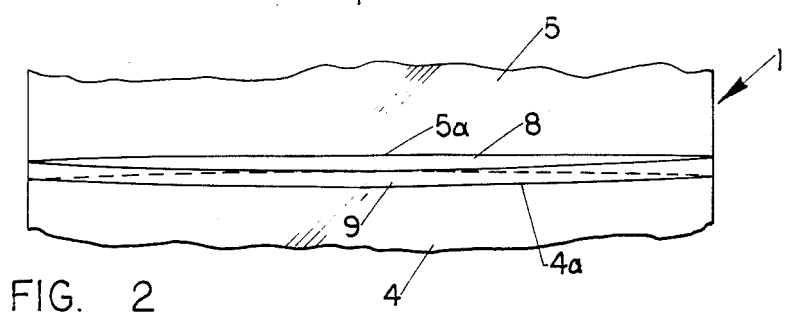
FIG. 2 is a fragmentary, semi-diagrammatic, enlarged elevational view of the bed and ram of the press brake of FIG. 1, illustrating, in exaggerated form, the deflections thereof under load.
Figure 3:
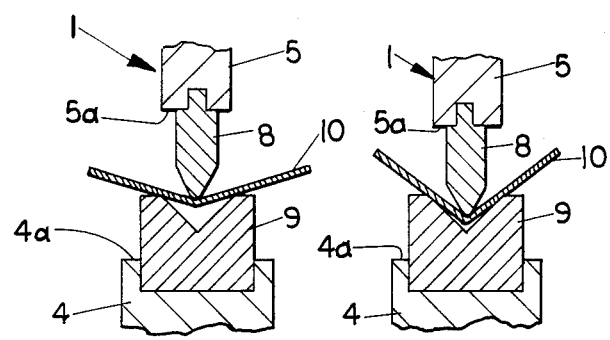
FIGS. 3 and 4 are fragmentary, semi-diagrammatic, cross sectional views illustrating, in exaggerated form, the relative positions under load of the bed and ram of FIGS. 1 and 2, their dies and the resulting bend in the workpiece at the center of the workpiece and near an end of the workpiece, respectively.
Figure 4:
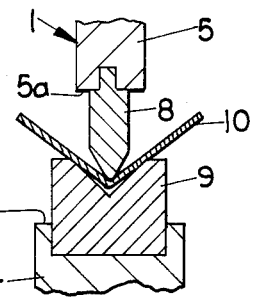
Figure 5:
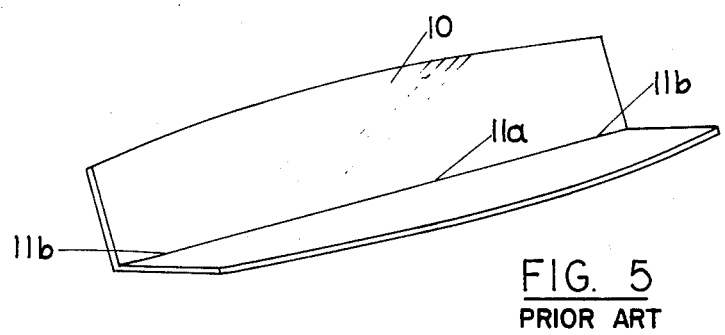
FIG. 5 is a perspective view illustrating, in exaggerated form, the fully bent workpiece of FIGS. 3 and 4.

If the tool or die-supporting edges 4a of the bed and 5a of the ram are parallel in the unloaded condition, they will be, under load, deflected away from each other to a non-parallel condition as shown, in exaggerated form, in FIG. 2. Because of this deflection, the male die 8 does not enter the female die 9 as far at the middle of the bend in the workpiece as it does at the ends of the bend in the workpiece. In FIG. 2, the workpiece is not shown for purposes of clarity. A workpiece 10 is shown, however, in FIGS. 3 and 4. FIG. 3 illustrates, in exaggerated form, the amount of penetration of the male die 8 into the female die 9 at the center 11a of the bend in workpiece 10 (i.e., at the longitudinal center of the workpiece). FIG. 4 illustrates, in exaggerated form, the amount of penetration of the male die 8 into the female die 9 near an end 11b of the bend in the workpiece 10 (i.e., near one end of the workpiece). This yields what is often termed a "canoe-shaped" or "barrel-shaped" workpiece, as shown in FIG. 5. The amount of angular variation is a function of the length of the bend and the percentage of available tonnage used. On short bends, it is very small (typically 0.1° on a 2-foot long bend). On long bends, the angular variation can be become very significant (as much as 4° in a 10-foot long bend in 20-gauge material on a typical 135-ton by 10-foot press brake having a 10-foot normal length bed).

As indicated above, the most usual prior art practice to overcome this problem has been to shim one of the dies (usually the female die 9) so that dies 8 and 9 are parallel in loaded condition. The fact that this is a trial-and-error process, changes with each load condition, and is time consuming, renders this solution less than ideal.

Another prior art expedient is illustrated, in exaggerated form, in FIG. 6. In FIG. 6, a bed 12 is fragmentarily shown, together with a ram 13. The bed 12 has a tool or die-supporting edge 12a and is shown supporting a female die 14. The ram 13 has a tool or die-supporting edge 13a and is illustrated as having a male die 15 mounted thereon.

The bed 12 and ram 13 of FIG. 6 are illustrated in their open, unloaded condition. It will be noted that the tool or die-supporting edges 12a and 13a are crowned so that they are closer together at their centers than at their ends. It is again to be emphasized that FIG. 6 greatly exaggerates the amount of crown. The amount of crown is carefully controlled so that the ram and bed are deflected to a parallel position when subjected to a load equal to some predetermined fraction (for example, ⅔) of the press brake's capacity, distributed uniformly over the nominal length. Under this applied load condition, the male die penetration is constant within the female die, and the bend angle is uniform along its length. As the load condition departs from the ideal upon which the crowning of bed 12 and ram 13 was based, the angular variation along the bend increases.

For example, in the instance of a long bend in thin material, where the bending load is much smaller than that required to remove the crown from the bed 12 and ram 13, the penetration of the male die 15 within female die 14 will be greater at the center of the bend than near its ends. FIG. 7 shows, in exaggerated form, the penetration of the male die 15 within female die 14 at the center 17a of the bend in workpiece 16. In a similar fashion, FIG. 8 illustrates, in exaggerated form, the penetration of the male die 15 within the female die 14 near one of the ends 17b of the bend in workpiece 16. Since the workpiece 16 is bent to a greater extent at its longitudinal center than near its ends, it will take on what is frequently termed an "hour-glass" shape as shown in FIG. 9. Again, the bend angle variation can be very large (as much as 10° in a 10-foot long bend in 20-gauge material on a typical 135-ton by 10-foot press brake having a 10-foot nominal length bed). This problem can be overcome by appropriately shimming the dies 14 and 15, but the problem with this sort of solution is the same as mentioned above with respect to shimming normally parallel dies.

The present invention is directed to a compensating assembly intended to overcome the above noted problems. The compensating assembly comprises a variable rate spring, the vertical deflection of which (under a uniformly distributed load), when added to the combined bed and ram deflections, yields a total deflection which is a constant along the length of the bed 4 and ram 5. Since this deflection is constant, the dies 8 and 9 (which are parallel in the unloaded condition) remain parallel under load, yielding constant penetration of the male die into the female die resulting in a uniform bend angle in the workpiece. Since the deflections of the bed 4, the ram 5 and the compensating device are all proportional to the load, the device automatically compensates for a load of any magnitude.

The principle of the present invention is graphically illustrated in FIGS. 10 through 13. In all of these FIGURES, the center line 18 represents the center line of the press brake of FIG. 1. The center line 19 represents the center line of housing 2, while the center line 20 represents the center line of housing 3. The plots of these FIGURES extend the length of the bed and ram. The plots of these FIGURES show deflections as absolute values, disregarding the directions of the deflections.

Turning first to FIG. 10, the X axis represents the distance along the ram between the ends of the ram 5. The Y axis represents the amount of deflection of the ram. The graph of FIG. 10 illustrates a plot of ram deflection along the length of the ram 5, when the ram is subjected to a uniformly distributed, full length capacity load. It will be noted that the maximum ram deflection takes place at the center line 18 of the press brake. Thus, at a given distance "x" from one end of ram 5 toward the center line 18, the ram deflection is represented by the arrow A.

Reference is now made to FIG. 11 which is similar to FIG. 10. In FIG. 11 the X axis represents the length of the bed 4, while the Y axis represents the amount of bed deflection. The plot of bed deflection over the length of the bed in FIG. 11 is for a uniformly distributed, full length capacity load. Again it will be noted that the maximum deflection occurs at the center line 18 of the press brake. The deflection of the bed at a distance "x" from one end of bed 4 toward the center line 18 is represented by arrow B.

In FIG. 12, the X axis represents the length of the deflection compensating unit of the present invention. The Y axis represents the amount of deflection of the compensating unit. The plot of FIG. 12 represents the deflection of the deflection compensating unit required so that when it is added to the deflections of the ram and bed under a uniformly distributed, full length capacity load, it will yield a constant total deflection along the bed and ram. It will be noted that at the center line of the press brake, the deflection of the deflection compensating unit is essentially zero. At a given distance "x" from one end of the deflection compensating unit toward center line 18, the deflection is represented at C.

In FIG. 13, the deflections under a uniform capacity, full length load of the ram, the bed and the deflection compensating unit are combined yielding a total deflection represented by arrow D which is uniform along the X axis. Under these conditions, the die 4a of bed 4 and the die 5a of ram 5 will be parallel throughout their length. To achieve this, the requirements are to determine the deflections plotted in FIG. 12 as a function of the position along the X axis, and then to design a deflection compensating device which will yield these deflections.

The deflections of FIG. 12 along the X axis are determined as follows. The ram deflection of FIG. 10 and the bed deflection of FIG. 11 are calculated for a uniformly distributed, full length capacity load for incremental values of "x" (i.e., positions along the ram and bed along their length). These calculations are made utilizing standard beam formulas as contained in strength of material textbooks, and are well known in the art. These deflections are added together and plotted on the graph of FIG. 13. The total deflection D is equal to the sum of the maximum ram and bed deflections at the center line 18 of the press brake. The deflection required from the deflection compensating unit at any position "x" along the X axis can then be calculated by simply substracting the sum of the bed and ram deflections (A+B) at that point from the total deflection (D). The result of these calculations yields the plot of FIG. 12. The plots of FIGS. 10–13 are all based upon a uniformly distributed, full length capacity load. A capacity load was chosen as a matter of convenience. A less than capacity load could have been used so long as the ram, the bed and the deflection compensating unit are subjected to the same uniformly distributed, full length load.

Reference is now made to FIGS. 14 through 20 wherein there is illustrated an exemplary deflection compensating unit that will yield the required deflection illustrated in FIG. 12. In FIGS. 14 through 20, like parts have been given like index numerals. The deflection compensating unit is generally indicated at 21. The deflection compensating unit 21 comprises a metallic box having a length equal to the length of the bed 4 and the ram 5 (FIG. 1). To this end, the deflection compensating unit comprises a bottom 22, a pair of longitudinal side walls 23 and 24, end plates 25 and 26, and a top 27.

Reference is made specifically to FIG. 18. The box bottom 22 has a longitudinally extending raised central portion 22a which extends upwardly between side walls 23 and 24. This arrangement establishes a minimum distance between side walls 23 and 24 and minimizes the entrance of dirt and foreign material within the box. The side wall 24 is affixed to the bottom 22 by a plurality of bolts 28 (see FIG. 16). One of the bolts 28 is shown in FIG. 18. The bolt passes through a shouldered perforation 29 in side wall 24 and into a threaded perforation 30 in the box bottom 22. It will be understood that side wall 23 will be similarly affixed to bottom 22 by bolts 31 (see FIG. 16). The box top 27 is affixed to the side walls 23 and 24 by bolts 32 and 33, respectively. The bolts 32 and 33 and the manner in which they attach the top 21 to the side walls 23 and 24 are substantially identical. One of the bolts 32 is shown in FIG. 18. The bolt 32 has a threaded shank 32a, an upper portion 32b of enlarged diameter and a head 32c. As a result, a shoulder 32d is formed between the threaded shank 32a and the enlarged portion 32b. Similarly, a shoulder 32e is formed between the enlarged portion 32b and the head 32c.

Figure 19:
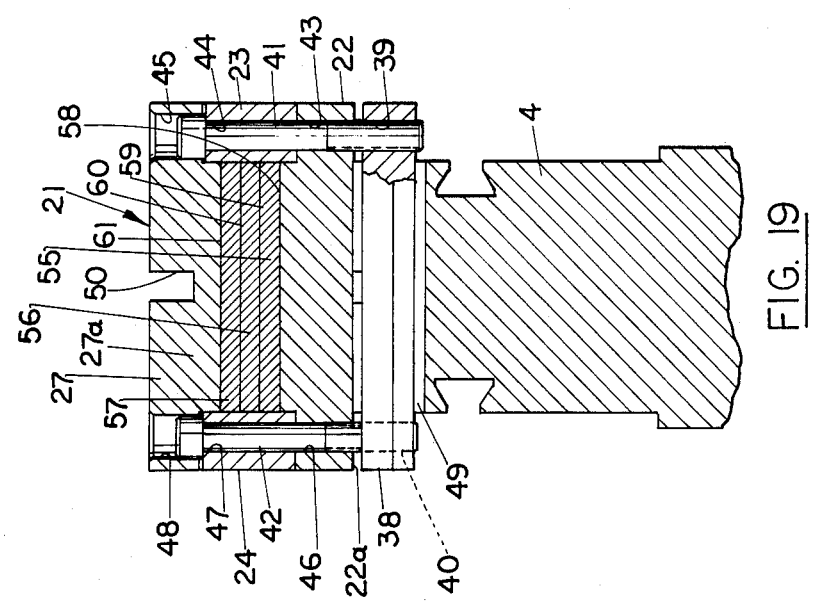
FIG. 19 is a fragmentary cross sectional view taken along section line 19—19 of FIG. 15.

The side wall 23 has a threaded perforation 34 adapted to received the threaded shank portion 32a of bolt 32. The shoulder 32d of bolt 32 engages the upper surface of side wall 23. The top 27 has a perforation 35 to receive the bolt 32. The perforation 35 has a first portion 35a of a diameter to just nicely receive the enlarged portion 32b of bolt 32 and a portion 35b of a diameter to just nicely receive the bolt head 32c. A shoulder 35c is formed between the portions 35a and 35b of the perforation 35. The bolt shoulder 32e is adapted to engage the shoulder 35c. Finally, it will be noted that the length of the enlarged bolt portion 32b is such that, when the bolt shoulder 32e engages the shoulder 35c, the top 27 is slightly spaced from the upper surface of side wall 23. The reason for this will be apparent hereinafter. The box bottom 22 has a planar bottom surface 22b, as can be clearly seen in FIG. 18. The bed 4 has a planar upper surface 4b. The deflection compensating unit 21 is adapted to be supported by the bed 4 with its bottom surface 22b resting upon the upper surface 4b of bed 4. The deflection compensating unit 21 may be affixed to the bed 4 by any appropriate means. An exemplary means for this purpose is illustrated in FIGS. 15 and 19.

The deflection compensating unit 21 may be provided with at least 2 T-nut assemblies. Two such assemblies are generally indicated at 36 and 37 in FIG. 15, the assemblies 36 and 37 being identical. The T-nut assembly 36 is most clearly shown in FIG. 19. The assembly comprises an elongated nut 38 of inverted T-shaped cross section. Near its ends, T-nut 38 is provided with threaded perforations 39 and 40. A pair of bolts 41 and 42 are threadedly engaged in the perforations 39 and 40, respectively. The bolt 41 passes through a perforation 43 in the box bottom 22 and a perforation 44 in side wall 23. The head of bolt 41 passes with clearance through a perforation 45 in the box top 27. In similar fashion, the bolt 42 passes through a perforation 46 in box bottom 22, a perforation 47 in side wall 24 and a perforation 48 in box top 27. The elongated T-nut 38 passes through a transverse slot 49 in bed 4. It will be understood that the transverse slot 49 will have an inverted T-shaped configuration dimensioned to permit the location of T-nut 38 therein with clearance. As indicated above, the T-nut assembly 37 is identical. As is clear from FIG. 19, the T-nut assemblies 36 and 37 enable the deflection compensating unit 21 to be clamped and fixed to the bed 4. Prior to tightening of the T-nut assembly bolts, the assemblies 36 and 37 permit some lateral shifting of the deflection compensating unit 21 with respect to the bed 4 to permit proper alignment of bed die 9 and ram die 8.

Figure 20:
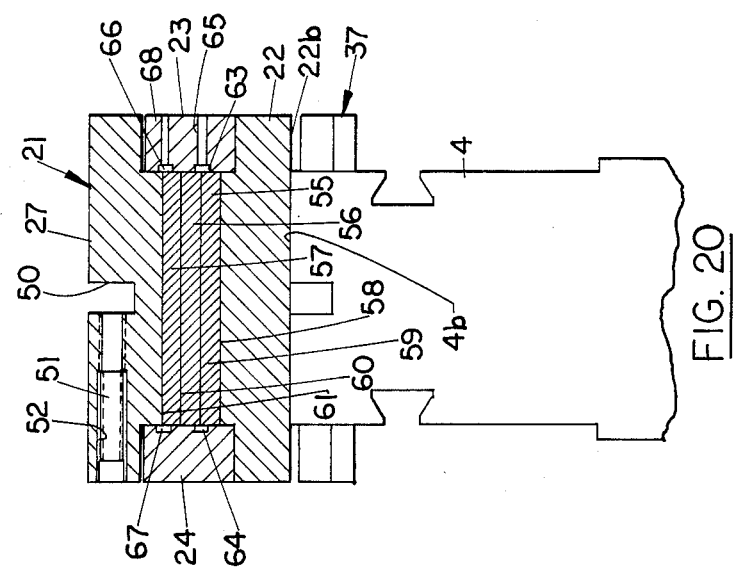
FIG. 20 is a fragmentary cross sectional view taken along section line 20—20 of FIG. 15.
Figure 22:
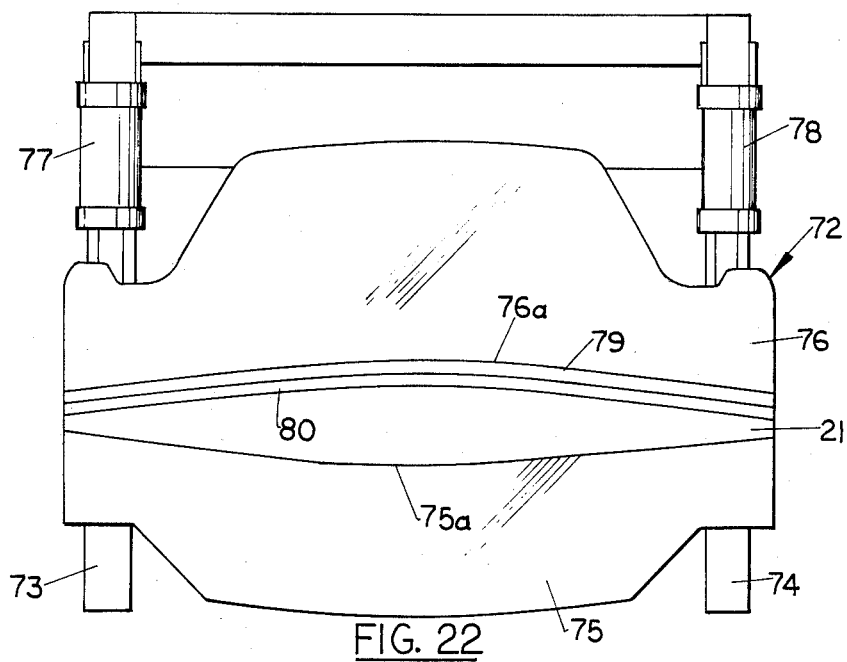
FIG. 22 is a semi-diagrammatic elevational view of a conventional press brake, the bed of which is provided with the compensating unit of the present invention, and illustrating in exaggerated form the resulting deflections of the ram and bed.

FIG. 22 is a semi-diagrammatic representation of a press brake provided with the deflection compensating unit 21. The lower or bed die 80 may be provided on its underside with a downwardly depending tongue 80a (see FIGS. 23 and 24) adapted to be received in a slot 50 in the upper surface of the deflection compensating unit top 27. As is most clearly shown in FIG. 20, the slot 50 extends longitudinally of the top 27 and centrally of its long axis. The tongue 80a of bottom or bed die 80 is engaged by a plurality of set screws 51 mounted in the deflection compensating unit top 27, as shown in FIG. 15. One of the set screws 51 is illustrated in FIG. 20, theadedly engaged in a perforation 52 extending transversely of the deflection compensating unit top 27 from one side thereof to the slot 50. When the tongue 80a of bottom or bed die 80 is located in the slot 50, the set screws 51 are tightened to lock the bottom die 80 in place.

The box-like structure of the deflection compensating unit 21 is completed by end plates 25 and 26. As is most clearly shown in FIG. 17, end plate 26 is affixed to side walls 23 and 24 and bottom 22 by bolts 53. It will be noted that end plate 26 is not affixed to top 27. In similar fashion, end plate 25 is affixed to the side walls 23 and 24 and the bottom 22 by bolts 54.

Within the box-like structure of the deflection compensating unit 21 there is located a plurality of elongated steel plates which act as beams when subjected to a vertical load. In the embodiment illustrated in FIGS. 14 through 20, three such plates are shown at 55, 56 and 57. The plates 55–57 are substantially identical and are so sized as to be just nicely received within the confines of side walls 23 and 24 and end plates 25 and 26.

The plates 55, 56 and 57 are separated from each other and from the box bottom 22 and the box top 27 by layers 58, 59, 60 and 61 of metallic shims 62. All of the shims 62 of all of the layers 58–61 are identical. The shims 62 of each of the layers 58–61 are arranged in parallel spaced relationship. The cross sectional view of FIG. 20 passes through a shim 62 in each of layers 59 and 61. It will be noted that the shim 62 of layer 59 has its ends located in shallow bores 63 and 64 formed in side walls 23 and 24, respectively. The bores 63 and 64 are so sized as to maintain the shim 62 in its proper position, while permitting slight vertical movement thereof. An additional bore 65, of slightly smaller diameter, is coaxial with and connected to the bore 63. The bore 65 serves as a view port to verify that shim 62 has been mounted in place.

In similar fashion, the shim 62 of layer 61 has its ends located in shallow bores 66 and 67, equivalent to shallow bores 63 and 64. Again, an additional bore 68 of smaller diameter is coaxial with and joins with bore 66, serving as a view port for shim 62 of layer 61, similar to view port 65. It will be understood that all of the shims 62 of all of the layers 58–61 will have their ends mounted in shallow bores in side walls 23 and 24. Preferably the shims are made of resilient material such as spring steel, and their ends can be located in their respective shallow bores simply by slightly bowing the shims and allowing them to snap in place.

Figure 21:
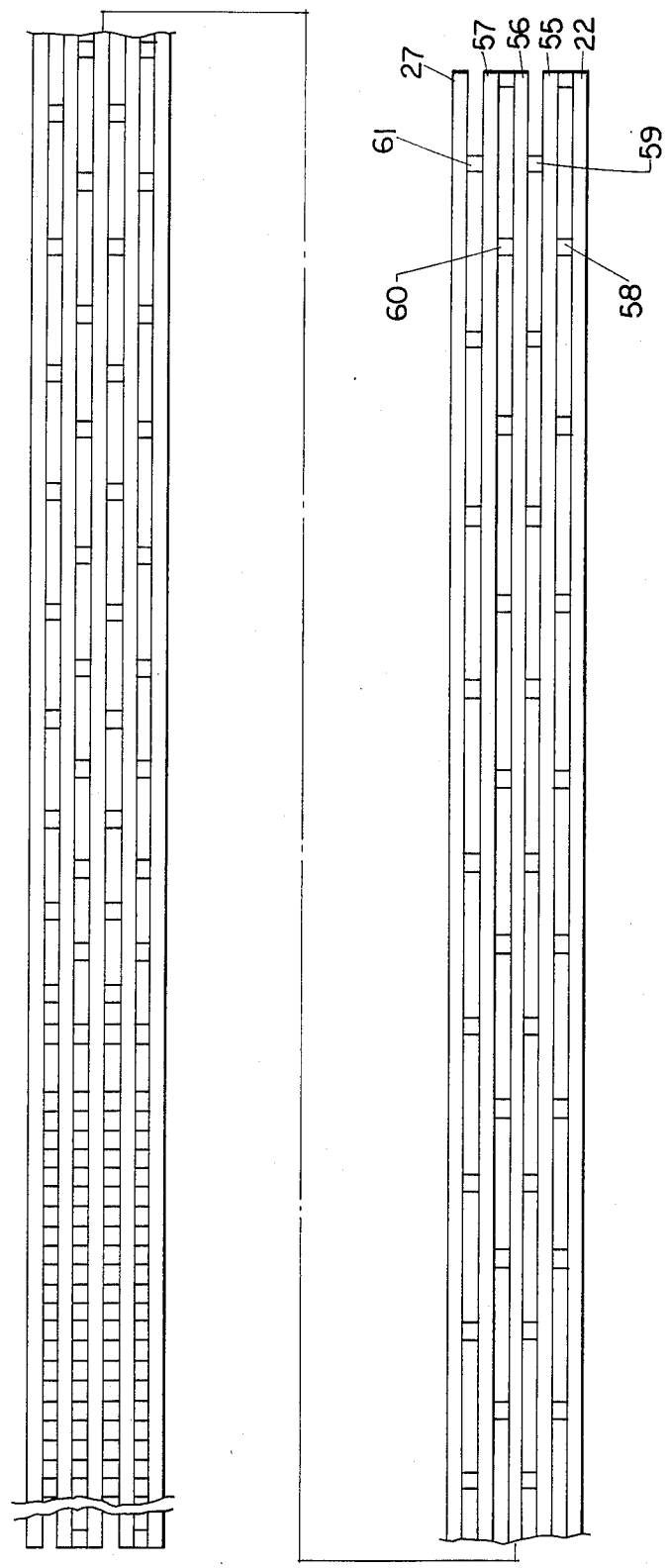
FIG. 21 is a fragmentary, semi-diagrammatic elevational view of the bottom, top, plates and shims of the structure of FIGS. 14 through 16 from the centerline to one end thereof.

In FIG. 16, the central portion of the deflection compensating unit 21 is generally indicated at 69. The top 27 of the deflecting compensating device 21 has been removed, exposing the shims 62 of the topmost layer 61 thereof arranged in close parallel spaced relationship. The shims 62 of shim layers 58, 59 and 60 are similarly arranged with the shims of the layers vertically aligned with respect to each other (see FIG. 21). This is true because, as is shown in FIG. 12, the deflection of the compensating unit 21 is zero at its center portion.

The right hand end of the compensating unit 21 is generally indicated at 70 in FIG. 16. The left hand end of the compensating device 21 is generally indicated at 71 in FIG. 16. It will be noted that at the end portion 70, the shims 62 of shim layer 61 are spaced apart by a greater distance. This distance increases from the central portion 69 to the end portion 70 (see FIG. 21). The particular position of the shims 62 of layer 61 is identical to the arrangement of shims in the layer 59, and the shim layers 61 and 59 will be substantially identical at the left end 71 of the compensating unit 21. At the left hand end 71 of the compensating unit 21 of FIG. 16 the plate 57 is broken away to reveal the shims 62 of layer 60, together with the plate 56. It will be noted that the arrangement of the shims 62 of layer 60 is staggered with respect to the arrangement of shims 62 of layer 61 at the right hand end 70 of the compensating device 21 (see also FIG. 21). The arrangement of the layer 60 of shims 62 will be the same at the right hand end 70 as is shown at the left hand end 71. The arrangement of the shims 62 in layer 58 will be identical to the arrangement of shim 62 in layer 60 at both ends of the compensating device 21. Thus it will be apparent that, with the exception of the shims in the central portion 69 of the compensating device 21, the shims of each layer are staggered with respect to the shims of the layer thereabove, as is most clearly shown in FIG. 21. Thus, for example, with the exception of the central portion 69 of the compensating device 21, the shims of layer 59 will be located intermediate the shims of layer 58. Similarly the shims of layer 60 will be located intermediate the shims of layer 59 and the shims of layer 61 will be located intermediate the shims of layer 60. In addition, the distance between shims of a given layer gradually increases from the central portion 69 to the end portion 70 and to the end portion 71.

The shims 62 of each of the layers 58, 59 and 60 act as supports for the plate 55, 56 or 57 located adjacent and above them. Each of the shims 62 of the shim layers 59, 60 and 61 apply the load to the one of plates 55, 56 and 57 located adjacent and below them. Each section of each plate 55, 56 and 57 supported between two adjacent shims 62 acts, in effect, like a beam of length "L" fixed at both ends. Since the layer of shims above each such section of the plates 55–57 will provide a shim centered with respect to the two shims supporting the plate section, each beam of length "L" acts as a beam fixed at both ends with a concentrated load at its center. This is true except at the central portion 69 of the compensating unit 21, where the deflection is intended to be zero, and no staggering of shims occurs on adjacent layers, thereby not creating any beams.

As will be noted from FIGS. 18, 19 and 20, the central portion of the compensating device top 27 normally rests upon the upper layer 61 of shims 62, with its lateral edges spaced slightly upwardly from the upper surfaces of side walls 23 and 24. Thus, the top 27 and the shims (as indicated earlier) are capable of slight downward movement to create downward deflection of plates 55 through 57. Since the central portion 27a of the top 27 fits between side walls 23 and 24, the top also serves to prevent or minimize the entrance of dirt and foreign material within the box-like structure and substantial lateral movement of top 27 is prevented.

The deflection of each section of the plates 55 through 57 at the mid point of the span "L" is calculated using conventional strength of material formulas for a beam fixed at both ends with a concentrated load at the center. These equations are as follows:

$Y_x = PL_x^3/192\ EI$

E = Modulus of elasticity (lb/In$^2$)

$I = BT^3/12$

I = Moment of inertia of the cross section (In.$^4$)

$P_x = wL_x$ $L_x$ = Length between supports at position x (In.)

$w = F/L_{total}$ $P_x$ = Applied load at position x (Lb.)

$(Y_{total})_x = N\ Y_x$ $Y_x$ = Deflection of one lengthwise bar at position x (In.)
   B = Width of lengthwise bars (In.)
   T = Thickness of lengthwise bars (In.)
   w = Applied load per inch of machine length (lb/In.)
   F = Capacity load for press brake (In.)
   $L_{total}$ = Total length of press brake (In.)
   $(Y_{total})_x$ = Total deflection at position x (deflection shown in FIG. 12) (In.)
   N = Quantity of lengthwise bars The total deflection at any given position "x" along the X axis of FIG. 12 is calculated by multiplying the deflection for one plate 55 through 57 by the number of plates.

As is shown in FIG. 12, the total deflection of the compensating unit 21 varies as a function of position along the length of the unit. This is accomplished by varying the length of the sections "L" of the plates as a function of position. As indicated above, near the center of the compensating unit 21 "L" is small yielding small deflections. The length "L" is at a maximum at the ends of the compensating unit, yielding maximum deflections.

There are a number of constraints on the compensating unit 21 of FIGS. 14 through 21 which establish the dimensions for plates 55 through 57 and the shims 62. The plates must be of proper size and strength so that the stresses to which they are subjected are within allowable levels. There must be a sufficient quantity of shims 62 to transmit the vertical load from the top 27 to the bottom 22. The width of the shims 62 should be minimized so that each section of each plate acts as a "fixed-fixed" beam. The height of the shims 62 should be minimized, but must be of sufficient dimension to provide space for the vertical deflection of the plates 55–57.

EXAMPLE

By way of example, a deflection compensating device of the type shown at 21 in FIGS. 14 through 21 was built and applied to the bed of a hydraulic press wherein the distance between the center lines of the housings was 10 feet. The ram and bed of the press brake each had a length of 12 feet, providing a 12 foot die space. The plates 55, 56 and 57 were made of steel, having a length of 12 feet, a width of 4.5 y load of 135 tons.

FIG. 22 illustrates a hydraulic press brake, generally indicated at 72, and similar to the press brake 1 of FIG. 1. The press brake 72 comprises a pair of housings 73 and 74, a bed 75, a ram 76 and a pair of hydraulic cylinders 77 and 78. The working edge 76a of ram 76 carries an upper die 79, the working edge 75a of bed 75 supports a deflection compensating unit identical to that shown in FIGS. 14 through 21 and generally indicated at 21. A lower die 80 is affixed to the compensating unit 21.

FIG. 22 is a diagrammatic representation of the press brake 72 under a uniformly distributed full length capacity load. It will be understood that the deflections illustrated for the bed 75, the ram 76 the deflection compensating unit 21 and the dies 79 and 80 are grossly exaggerated for purposes of clarity. For example, maximum deflections encountered in the press brake of the above noted example were about 0.040 inch.

The operation of the present invention may be described as follows. When the press brake 72 is provided with the compensating unit 21 of the present invention, the die-supporting edge 76a of ram 76 and the working edge 75a of bed 75 (and the upper surface of the compensating unit 21) will normally be parallel when not under load, in a manner similar to that described with respect to FIG. 1. When the ram 76 descends and its male die 79 bends the workpiece into the female die 80 of bed 75, the ram 76 and the bed 75 will be under load. As a consequence, the ram 76 will deflect upwardly and the bed 75 will deflect downwardly, as shown in FIG. 22. The deflection compensating unit 21 operates such that, at any point along the length of the bed 75, the deflection of the compensating unit 21 plus the deflection of the ram 76 plug the deflection of the bed 75 will be constant, in keeping with FIG. 12. As is indicated in FIG. 13, this constant total deflection is substantially equal to the maximum deflection of the bed and ram at the center line of press brake 72. The net result is that the die supporting edge 76a of ram 76 and the upper surface of the deflection compensating unit 21 remain essentially parallel throughout their lengths, and the penetration of the male die 79 into female die 80 (and hence the bend angle) is substantially constant along the length of the workpiece (not shown).

Figures 23, 24:
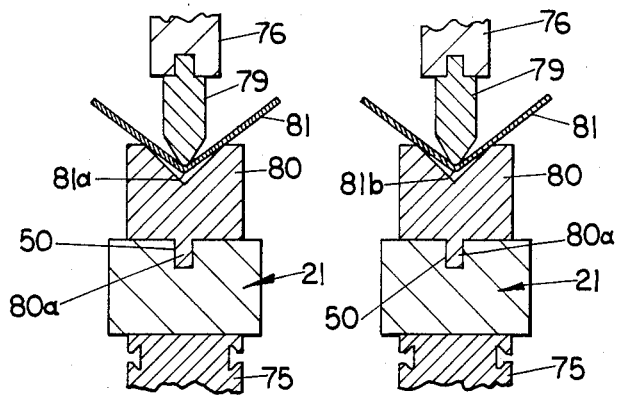
FIGS. 23 and 24 are fragmentary, cross sectional views of FIG. 22, similar to FIGS. 3 and 4 and FIGS. 7 and 8, illustrating the relative positions of the bed and ram and their dies, and the resulting bend in the workpiece at the center and at one end of the workpiece, respectively.
Figure 25:
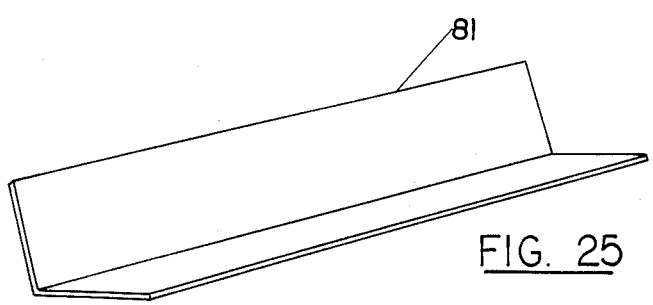
FIG. 25 is a perspective view illustrating the fully bent workpiece of FIGS. 23 and 24.

FIG. 23 is a fragmentary cross sectional view of press brake 72 taken at the longitudinal center of a workpiece 81. FIG. 24 is a cross sectional view, similar to FIG. 23, but taken near one end of the workpiece 81. It will be noted that the bend angle 81a in FIG. 23 is substantially identical to the bend angle 81b in FIG. 24. FIG. 25 is a perspective view of the workpiece 81, having a substantially uniform bend angle throughout its length.

It will be understood by one skilled in the art that the deflection compensating unit 21 of the present invention could be mounted on ram 76, rather than the bed 75, and the purpose of the present invention would be achieved. Under these circumstances, the compensating unit 21 would be affixed to the working edge 76a of ram 76 and the upper die 79 would be affixed to the compensating unit 21. The lower die 80 would be affixed to the working edge 75a of bed 75. Except for these differences, the compensating unit 21 would otherwise work in an identical manner, causing upper die 79 to remain substantially parallel to lower die 80. This arrangement would also produce a workpiece having a substantially uniform bend angle throughout its length.

From the above, it will be evident that if the deflection compensating unit 21 is mounted on bed 75, the lower die 80 achieves substantial parallelism with the upper die 79, under a uniformly distributed full length load. If the deflection compensating unit 21 is mounted on the ram 76, then the upper die 79 will achieve substantial parallelism with lower die 80, under such a load.

So long as the dies 79 and 80 remain substantially parallel, it is of no consequence that they bow slightly upwardly or slightly downwardly, since the amount of this deflection is well within the elastic limit of the metallic workpiece in the lengthwise direction and a straight workpiece with a uniform bend angle throughout its length (as shown in FIG. 25) will be achieved.

It should be noted that the above described deflection compensating unit 21 can be designed to compensate perfectly for a uniformly distributed capacity load for one given length. It will not compensate perfectly for other length capacity bends. Nevertheless, if the device is designed to compensate for a uniformly distributed full length capacity load, the deviation from perfection with a lesser length capacity load is small and the error is not significant.

It should be noted that the particular design and construction of the deflection compensating unit of FIGS. 14 through 21 constitutes only one way of achieving the basic requirement of the present invention, i.e., a variable rate spring which deflects in the manner shown in FIG. 12 when subjected to a uniformly distributed full length capacity load.

Figure 26:
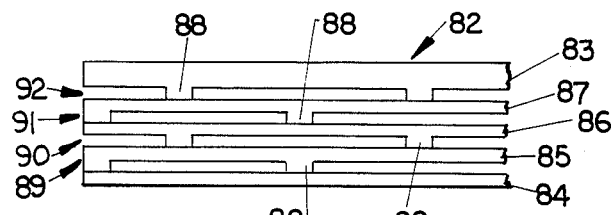
FIGS. 26 and 27 are fragmentary, semi-diagrammatic, elevational views of deflection compensating units (similar to that of FIG. 14), wherein the shims constitute integral parts of the top and bottom of the box and integral parts of at least some of the plates.

For example, FIG. 26 is a fragmentary simplified view of a modification of the structure of FIGS. 14 through 21. In this instance, the deflection compensating unit is generally indicated at 82. The compensating unit 82 again comprises a box-like structure, the top of which is shown at 83 and the bottom of which is shown at 84. The top 83 and bottom 84 are equivalent to the top 27 and bottom 22 of the embodiment of FIGS. 14 through 21. A plurality of plates 85, 86 and 87, equivalent to plates 55, 56 and 57, are located between top 83 and bottom 84. FIG. 26 illustrates one end of the compensating unit 82. Side walls and an end plate equivalent to side walls 23 and 24 and end plate 25 of FIGS. 14 through 20 have been eliminated for purposes of clarity. A series of transverse shims are shown at 88. These shims are equivalent to the shims 62 of FIGS. 14 through 21. The shims are arranged in layers 89 through 92 similar to shim layers 58 through 61 of FIGS. 14 through 21. The shims 88 have been exaggerated in height, for purposes of clarity. The only difference between the structure of FIG. 26 and that of FIGS. 14 through 21 lies in the fact that the shims 88 of layer 89 constitute an integral part of plate 85. In a similar fashion, the shims 88 of layer 90 constitute an integral part of plate 86 and the shims 88 of layer 91 constitute an integral part of plate 87. The shims 88 of the uppermost layer 92 thereof constitute an integral part of the top 83. With the exception of this difference, the operation of the deflection compensating unit 82 is identical to that of FIGS. 14 through 21.

Figure 27:
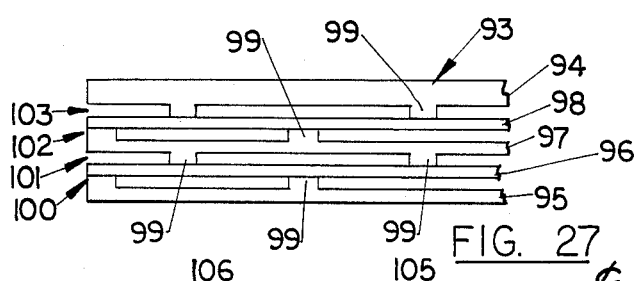

FIG. 27 is a fragmentary, simplified view of yet another modification of the deflection compensating unit of FIGS. 14 through 21. The deflection compensating unit is generally indicated at 93. Again the unit is made up of plates and shims located in a box-like structure. The top of the box-like structure is shown at 94. While the bottom is shown at 95.

FIG. 27 is a fragmentary view of one end of the deflection compensating unit 93. The side walls and end plate of the structure have been deleted for purposes of clarity. The FIGURE illustrates plates 96, 97 and 98 equivalent to plates 55, 56 and 57 of the embodiment of FIGS. 14 through 21. Shims 99, equivalent to shims 62 of FIGS. 14 through 21, are arranged in layers 100 through 103, equivalent to the layers 58 through 61 of FIGS. 14 thorugh 21. In this particular embodiment, the shims 99 of layer 100 constitute integral parts of the structure bottom 95. The shims 99 of the uppermost layer 103 constitute an integral part of the top 94. The shims 99 of intermediate layers 101 and 102 both constitute integral parts of the intermediate plate 97. Plates 96 and 98 are simple planar structures. With the exception of these changes, the deflection compensating unit 93 of FIG. 27 is otherwise similar to and operates substantially identically to the deflection compensating unit 21 of FIGS. 14 through 21 and the deflection compensating unit 82 of FIG. 26.

Figure 28:
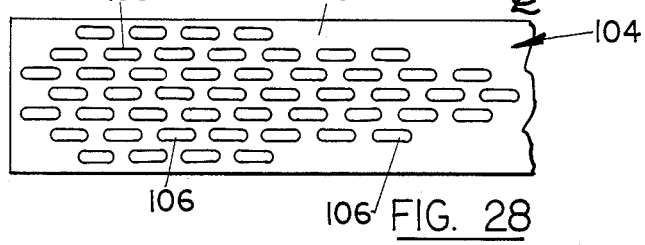
FIG. 28 is a fragmentary elevational view of another embodiment of the present invention.

FIG. 28 illustrates another embodiment of the deflection compensating unit. The compensating unit in this instance is generally indicated at 104 and comprises an elongated metallic block. FIG. 28 illustrates ½ of the compensating unit, the center line being indicated in the FIGURE. In this instance, the metallic block 105 is provided with a plurality of elongated transverse perforations 106. The perforations 106 are arranged in horizontal rows. The perforations of each horizontal row are staggered with respect to the perforations of adjacent horizontal rows. It will be noted that the perforations 106 are also arranged in vertical rows. The number of horizontal rows increases from the center of the compensating unit 104 toward its end. As a consequence, the number of perforations in the vertical rows increases from the center of the compensating unit 104 toward its end. It will be understood that the half of the compensating unit 104 not shown will constitute a mirror image of the half shown. Since the number of perforations is at a minimum at the center of the device and at a maximum near its ends, the compensating device 104 can be made to provide the required deflection illustrated in FIG. 12.

Figure 29:
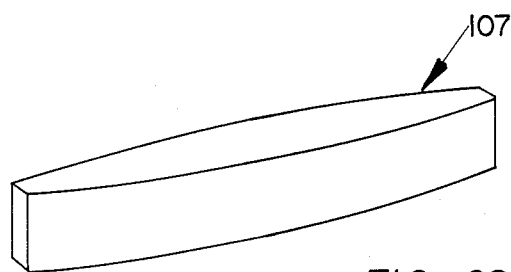
FIG. 29 is a simplified perspective view of another embodiment of the present invention.

FIG. 29 illustrates another deflection compensating unit, generally indicated at 107. This unit comprises an elongated block of polyurethane or similar material of a length equal to the length of the bed and ram of a press brake. The unit 107 may be located within a box-like structure of the general type described with respect to FIGS. 14 through 21. It will be noted that the block 107 is of uniform height throughout its length. The block 107 has a maximum width at its center and tapers to a lesser width at its ends. By virtue of this shape, the deflection will be near zero at the center of the unit 107 and at a maximum near its ends, corresponding to the required deflection illustrated in FIG. 12.

Figure 30:
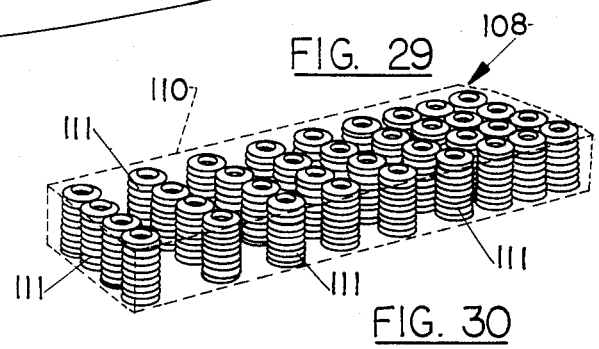
FIG. 30 is a simplified perspective view of yet another embodiment of the present invention.

Yet another embodiment of the deflection unit of the present invention is generally indicated at 108 in FIG. 30. The deflection unit 108 comprises a box-like structure illustrated in broken lines at 110. The box-like structure may be similar to that illustrated in FIGS. 14 through 20.

FIG. 30 illustrates one-half of the deflection compensating unit 108 with its center portion shown at the right of the figure and one of its ends shown at the left of the figure. It will be understood that the one-half the compensating unit 108 not shown will te constitute a mirror image of the half shown. In this instance, the interior of the box-like structure 110 is provided with a plurality of stacks 111 of Belville springs. The stacks 111 of Belville springs each contain an equal number of spring elements and are arranged in rows extending transversely of the box-like structure 110. Each transverse row contains the same number of spring stacks. It will be noted, however, that the transverse rows are concentrated at the center of the structure and are spaced from each other by gradually increasing distances toward the end of the structure. This arrangement, again, will constitute a variable rate spring yielding the required deflection of FIG. 12.

Other arrangements of the spring stacks could be made. For example, the transverse rows of spring stacks could be aligned side by side throughout the length of the compensating unit with each row at the center of the unit having a maximum number of stacks, the number of stacks per transverse row diminishing toward the ends of the unit. In other words, the stacks would be arranged to form an envelope thereof similar in shape to the polyurethane block of the compensating unit 107 of FIG. 29.

In yet another arrangement, if the box-like structure 110 were provided with a bottom of appropriate arched configuration the necessary deflection equivalent to that shown in FIG. 12 could be achieved by providing a plurality of transverse rows of the spring stacks in side-by-side arrangement throughout the length of the unit. In this instance, however, the number of spring elements per stack would be varied, being at a mimimum at the center of the unit and building up toward a maximum at the end of the unit.

From the above, it will be evident that the present invention provides a deflection compensating unit in the form of a variable rate spring which deflects in accordance with FIG. 12 when subjected to a uniformly distributed, full length load. The elastic member with variable spring rate of the present invention can be applied to any deflection sensitive fabricating machine tool. The deflection compensating unit of the present invention is inexpensive to manufacture and more accurate for the length for which it is designed. It can be added to existing machines and the machines can be either mechanically or hydraulically actuated. When applied to a press brake, it can be used in conjunction with air bending dies and bottoming dies.

Modifications may be made in the invention without departing from the spirit of it.

What we claim is:

1. A deflection compensating means for use with a press brake of the type having a bed and a ram with opposed die-supporting edges, cooperating dies operatively mounted on said edges, and means operatively connected to said ram to shift said ram away from said bed and toward said bed against a workpiece supported on said bed die, whereby said bed and ram are placed under load resulting in opposite deflections of said bed and ram and non-parallelism of said die-supporting edges, said deflection compensating means being located between said die-supporting edge and said die of a selected one of said bed and ram and extending the length of said die-supporting edge, said deflection compensating means comprising a variable rate spring means having a deflection when subject to a uniformly distributed load and when added to said deflections of said bed and ram yielding a total deflection which is constant along the length of said bed and ram, said deflection of said variable rate spring means is proportional to the bending load so that said variable rate spring means automatically compensates for any variation in bending load, whereby said die-supporting edge on said deflection compensating means is substantially parallel to the other of said die-supporting edges when under a uniformly distributed load.

2. The structure claimed in claim 1, wherein said deflection compensating means comprises a self-contained unit attachable and detachable to at least one of said bed and ram die-supporting edges and capable of mounting at least one of said bed and ram dies.

3. The structure claimed in claim 1 wherein said deflection compensating means is mounted on said die-supporting edge of said bed.

4. The structure claimed in claim 1 wherein said deflection compensating means is mounted on said die-supporting edge of said ram.

5. The structure claimed in claim 1 wherein said deflection compensating means comprises an elongated box-like structure having sides, ends, a bottom and a top, said box-like structure extending the length of said die-supporting edge upon which it is mounted, said top having a longitudinal central portion extending downwardly between said sides and lateral flanges overlying the upper surfaces of said sides, fastening means affixing said top to said upper surfaces of said sides such that said top is captively mounted on said box-like structure with said top side flanges being shiftable toward and away from the upper surfaces of said sides by a slight amount, a plurality of elongated plates of such size as to be just nicely received within said box-like structure and arranged therein in a stack, a layer of shims is located between the bottommost plate and said bottom of said box-like structure, between the topmost plate and said central portion of said top of said box-like structure and at the interface of adjacent plates, said shims extending transversely of said plates, bottom and top, the shims of each layer at the longitudinal central portions of said plates being closely and uniformly spaced from each other, the shims of each layer along the remainder of said plates being spaced from each other by distances which increase toward the ends of said plates, the shims of the layers being vertically aligned one above the other in said central portions of said plates, the remainder of the shims of the layers being vertically staggered with respect to each other, each shim of a layer being centered with respect to a pair of shims of an adjacent layer, said plates and layers of shims normally supporting said top with its side flanges spaced from said upper surfaces of said sides, the deflection of said unit being near zero at its longitudinal central portion and at a maximum at its ends when subjected to a uniformly distributed load.

6. The structure claimed in claim 1 wherein said compensating means comprises an elongated metallic block extending the length of said die-supporting edge upon which it is mounted, said block having a plurality of transverse perforations formed therein, each perforation being elongated in the direction of the long axis of said block, said perforations being arranged in horizontal rows, the perforations of each row being staggered with respect to the perforations of adjacent rows, the number of rows at the longitudinal central portion of said block being at a minimum with the number of rows increasing toward each end of said block, whereby the deflection of said block will be near zero at its longitudinal central portion and at a maximum at its ends.

7. The structure claimed in claim 1 wherein said deflection compensating means comprises a block of resilient compressible material of a length equal to the length of said die-supporting edge on which it is mounted, said block having a uniform weight throughout its length, said block having a maximum width at its longitudinal central portion, said block tapering to a lesser width at its ends, whereby the deflection of said block will be near zero at its longitudinal central portion and at a maximum at its ends.

8. The structure claimed in claim 1 wherein said deflection compensating means comprises an elongated box-like structure having sides, ends, a top and a bottom, said box-like structure extending the length of said die-supporting edge upon which it is mounted, said top having a longitudinal central portion extending downwardly between said sides and lateral flanges overlying the upper surfaces of said sides, fastening means affixing said top to said upper surfaces of said sides such that said top is captively mounted on said box-like structure with said top side flanges being shiftable toward and away from the upper surfaces of said sides by a slight amount, said box-like structure containing a plurality of stacks of Belville springs, each stack of Belville springs contacting said bottom and said longitudinal central portion of said top normally maintaining said top side flanges spaced from said upper surfaces of said sides, said stacks of Belville springs being so arranged that the deflection of said unit will be near zero at its longitudinal central portion and at a maximum at its ends.

9. The structure claimed in claim 5 wherein the ends of each of said shims are located in perforations in said sides.

10. The structure claimed in claim 5 wherein said shims of said layer between said bottommost plate and said bottom comprise integral parts of said bottommost plate, said shims of said layer between said top and said topmost plate comprise integral parts of said top and said shims of said layers at said interfaces between adjacent plates comprise integral parts of the upper plate at said interface.

11. The structure claimed in claim 5 wherein said shims of said layer between said bottommost plate and said bottom comprise integral parts of said bottom, said shims of said layer between said top and said topmost plate comprise integral parts of said top and said shims of said layers at said interfaces between adjacent plates comprise integral parts of selected ones of said plates.

12. The structure claimed in claim 5 including means in association with said top for mounting a die thereon.

13. The structure claimed in claim 5 including means in association with said bottom to mount said unit to said die-supporting edge.

14. The structure claimed in claim 8 wherein each stack contains the same number of Belville springs, said stacks being arranged in rows extending transversely of said box-like structure, said transverse rows being concentrated in the longitudinal central portion of said box-like structure, said transverse rows being spaced from each other by gradually increasing distances toward the ends of said box-like structure.

* * * * *